Patented Apr. 7, 1925.

1,532,645

UNITED STATES PATENT OFFICE.

CLAYTON W. BEDFORD, OF AKRON, OHIO, ASSIGNOR TO THE GOODYEAR TIRE & RUBBER COMPANY, OF AKRON, OHIO, A CORPORATION OF OHIO.

METHOD OF VULCANIZING RUBBER.

No Drawing. Application filed August 16, 1921. Serial No. 492,825.

*To all whom it may concern:*

Be it known that I, CLAYTON W. BEDFORD, a citizen of the United States, residing at Akron, in the county of Summit and State of Ohio, have invented new and useful Improvements in Methods of Vulcanizing Rubber, of which the following is a specification.

My invention relates to the vulcanization or curing of caoutchouc substances and it has, for its primary object, the provision of a vulcanizing agent which shall be highly efficient in operation and which shall insure obtaining a high quality product.

Heretofore, the use of metallic polysulfides has been limited almost entirely to antimony polysulfides, although arsenic polysulfides have also been recognized as useful in the curing of rubber or rubber compounds. On account of the high valency of antimony, it is necessary to utilize relatively large amounts of its polysulfide in order to supply a definite amount of available sulfur for the vulcanization of rubber, as compared to what would be necessary if its valency were lower.

The polysulfides of alkali and alkaline earth metals are soluble in water and do not lend themselves readily to the formation of dry compounding materials. Moreover, the alkali polysulfides have the same deteriorating effect as free alkali upon the aging properties of rubber. The alkaline earth polysulfides are inconvenient to handle because they stain and affect the hands of the operator. The polysulfides of zinc are yellowish white powders which have none of these disadvantages. They are not alkaline in character, do not affect the skin and are not soluble in or decomposed by water.

I have now found that the insoluble polysulfides of bivalent metals, especially those of zinc, are valuable curing agents and afford many characteristic advantages over the polysulfides of tri- and penta-valent metals.

Schiff (Lieb. Ann. 115 (1860) 74) in an article entitled "The polysulfides of heavy metals" has dealt with the polysulfides of a large number of heavy metals other than those of antimony and arsenic. He found most of them to be unstable and only obtainable by special precautions. He also states that the polysulfides of zinc do not easily decompose and can easily be isolated and manipulated.

In investigating the work of Schiff, I observed, in working with dilute solutions of zinc salts and sodium pentasulfide, the following phenomena: A large amount of a zinc solution, preferably the acetate, may be added to a dilute sodium pentasulfide solution without causing a precipitate to form. This is illustrated by the following equations as similar to the addition of a solution of zinc salts to a solution of caustic soda without precipitation.

1. $Zn(Ac)_2 + 4NaOH \rightarrow 2NaAc + Zn(ONa)_2$ soluble $+ 2H_2O$.
2. $Zn(Ac)_2 + 2Na_2S \rightarrow 2NaAc + Zn(SNa)_2$ soluble.
3. $Zn(Ac)_2 + 2Na_2S_5 \rightarrow 2NaAc + Zn(S_5Na)_2$ soluble.

For substantiation of the first two equations, reference may be made to an article by Thomsen (Ber. 11 (1878) 2044) on "Zinc sulfhydrates".

Upon further addition of zinc salt solution, a precipitate forms which is very colloidal in character and filters with great difficulty or not at all. The high molecular weight of similar precipitates has been shown by Linder & Picton (J. C. S. 61 (1892) 114). The next step in the reaction may, therefore, be written as follows:

4. $2Zn(S_5Na)_2 + Zn(Ac)_2 \rightarrow 2NaAc + (Na-S_5-Zn-S_5)_2Zn$

Continuing the addition of zinc salt solution, there finally results a granulation of the precipitate with excess of the zinc salt. The precipitate therefore consists of $(ZnS_5)_x$ with perhaps an acidic or hydroxyl group on the end zinc atoms or without the same by the closing of the chain of $-ZnS_5-$ links.

I also find that similar reactions proceed with more or less sulfur than $S_5$ down to the use of $Na_2S$ without extra sulfur and that the precipitates so formed are capable of picking up extra sulfur or of dropping off sulfur, tending to approach the most stable polysulfide compound which seems to be that of $S_5$, which corresponds to the grouping in the sulfate radical

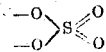

or

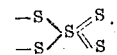

and evidently consists of a bivalent group of sulfur atoms having a high degree of reactivity.

I have now found that the porysulfides of zinc are valuable vulcanizing agents, as illustrated by the following example.

*Example.*—The precipitate of $(ZnS_5)_y$ is compounded with rubber in proportion to furnish 5% of sulfur, assuming that four of the sulfurs are available for that purpose. This may be done by any desirable method, preferably by milling the wet precipitate into the rubber and later removing the water by any suitable or well known method. Upon vulcanizing at a temperature corresponding to forty pounds pressure of steam, the product is found to be over cured in 2 hours, under cured but well set in 45 minutes, while in 60 to 75 minutes, a good product is produced. Five per cent of ordinary sulfur will not give a satisfactory cure in less than about 3½ hours.

It should be noted that free sulfur may be utilized with zinc persulfides, as well as the usual compounding ingredients and the process, furthermore, is not limited to the use of persulfide alone.

Other metals, with the exception of antimony and arsenic, are limited in their use by the relative instability of their polysulfides or by being strongly alkaline and water soluble.

It will be understood that the present invention should not be limited by the specific examples which have been set forth, or by such theoretical statements as may have been made, nor is the invention dependent upon the soundness or accuracy of such theoretical statements and it should be restricted, therefore, only by the prior art and as indicated by the appended claims.

What I claim is:

1. A process of vulcanizing rubber that comprises admixing a zinc persulfide with rubber and applying heat thereto.

2. A process of vulcanizing rubber that comprises admixing a zinc pentasulfide with rubber and applying heat thereto.

3. A process of vulcanizing rubber that comprises admixing a zinc persulfide with rubber and inert fillers and applying heat thereto.

4. A vulcanized rubber product produced by admixing zinc persulfide with rubber and applying heat thereto.

5. A vulcanized rubber product produced by admixing zinc pentasulfide with rubber and applying heat thereto.

6. A vulcanized rubber product produced by admixing zinc persulfide with rubber and inert fillers and heating the mixture.

In witness whereof I have hereunto signed my name in the presence of two subscribing witnesses.

CLAYTON W. BEDFORD.

Witnesses:
L. M. HARTMAN,
J. E. KEATING.